US006883705B2

(12) United States Patent
Gebhardt

(10) Patent No.: US 6,883,705 B2
(45) Date of Patent: Apr. 26, 2005

(54) METHOD AND SYSTEM FOR PROCESSING BANK NOTES

(75) Inventor: Manfred Gebhardt, Eching (DE)

(73) Assignee: Giesecke & Devrient GmbH, Munich (DE)

( * ) Notice: Subject to any disclaimer, the term of this patent is extended or adjusted under 35 U.S.C. 154(b) by 70 days.

(21) Appl. No.: 10/401,720

(22) Filed: Mar. 31, 2003

(65) Prior Publication Data

US 2003/0189091 A1 Oct. 9, 2003

(30) Foreign Application Priority Data

Apr. 5, 2002 (DE) ........................................ 102 15 006

(51) Int. Cl.[7] ................................................ G06F 17/60
(52) U.S. Cl. ......................................... 235/379; 902/16
(58) Field of Search ................................ 235/375, 379, 235/380; 221/9, 13; 705/22, 28, 30, 39, 40, 43; 902/8–10, 38, 12–17

(56) References Cited

U.S. PATENT DOCUMENTS 4,325,494 A * 4/1982 Fish ............................ 221/13
5,478,992 A 12/1995 Hamada et al.
6,474,546 B1 * 11/2002 Niizuma ..................... 235/379
2001/0053946 A1 12/2001 Olson et al.

FOREIGN PATENT DOCUMENTS

DE 100 30 221 A1 1/2002
DE 100 30 277 A1 2/2002

* cited by examiner

*Primary Examiner*—Michael G. Lee
*Assistant Examiner*—Jamara A. Franklin
(74) *Attorney, Agent, or Firm*—Bacon & Thomas, PLLC

(57) ABSTRACT

A method and corresponding system for processing bank notes wherein bank notes are provided in a stack and each has a serial number. The bank notes are arranged according to a first sequence of their serial numbers. According to the method and system, the bank notes are removed singly from the stack and processed successively in accordance with the first sequence of their serial numbers. A second sequence of serial numbers of the processed bank notes is determined. To minimize throughput losses in the case of disturbances during processing of a subset of bank notes, the following steps are implemented: depositing the subset of bank notes; continuing the processing of following bank notes in the stack in accordance with the first sequence of their serial numbers; and continuing the determination of the second sequence of serial numbers for the properly processed following bank notes using a hypothetical number of bank notes in the subset.

28 Claims, 2 Drawing Sheets

| F1 | F2 | F1-F2 |
|---|---|---|
| DCA2345678901 | DCA2345678901 | |
| DCA2345678902 | DCA2345678902 | |
| DCA2345678903 | DCA2345678903 | |
| DCA2345678904 | DCA2345678904 | |
| DCA2345678905 | DCA2345678905 | |
| DCA2345678906 | DCA2345678906 | |
| DCA2345678907 | - | DCA2345678907 |
| DCA2345678908 | - | DCA2345678908 |
| DCA2345678909 | DCA2345678909 | |
| DCA2345678910 | DCA2345678910 | |
| DCA2345678911 | DCA2345678911 | |
| DCA2345678912 | DCA2345678912 | |
| DCA2345678913 | DCA2345678913 | |
| DCA2345678914 | DCA2345678914 | |
| : | : | |
| : | : | |

| F1 | F2 | F1-F2 |
|---|---|---|
| DCA2345678901 | DCA2345678901 | |
| DCA2345678902 | DCA2345678902 | |
| DCA2345678903 | DCA2345678903 | |
| DCA2345678904 | DCA2345678904 | |
| DCA2345678905 | DCA2345678905 | |
| DCA2345678906 | DCA2345678906 | |
| DCA2345678907 | - | DCA2345678907 |
| DCA2345678908 | - | DCA2345678908 |
| DCA2345678909 | DCA2345678909 | |
| DCA2345678910 | DCA2345678910 | |
| DCA2345678911 | DCA2345678911 | |
| DCA2345678912 | DCA2345678912 | |
| DCA2345678913 | DCA2345678913 | |
| DCA2345678914 | DCA2345678914 | |
| : | : | |
| : | : | |

Fig. 2

| F2 | F1-F2 | F2k |
|---|---|---|
| DCA2345678901 | | DCA2345678901 |
| DCA2345678902 | | DCA2345678902 |
| DCA2345678903 | | DCA2345678903 |
| DCA2345678904 | | DCA2345678904 |
| DCA2345678905 | | DCA2345678905 |
| DCA2345678906 | | DCA2345678906 |
| - | DCA2345678907 | DCA2345678910 |
| - | DCA2345678908 | DCA2345678911 |
| DCA2345678909 | | DCA2345678912 |
| DCA2345678910 | | DCA2345678913 |
| DCA2345678911 | | DCA2345678914 |
| DCA2345678912 | | : |
| DCA2345678913 | | : |
| DCA2345678914 | | |
| : | | |
| : | | |

| T |
|---|
| DCA2345678907 |
| DCA2345678908 |
| DCA2345678909 |

Fig. 3

METHOD AND SYSTEM FOR PROCESSING BANK NOTES

This invention relates to a method for processing bank notes wherein bank notes are provided in a stack, the bank notes each having a serial number and being present in the stack in accordance with a first sequence of their serial numbers, the bank notes are removed singly from the stack and processed successively in accordance with the first sequence of their serial numbers, and wherein a second sequence of the serial numbers of processed bank notes is determined.

In addition, the invention relates to a corresponding system for processing bank notes.

Such methods and systems are used in particular in machine checking of freshly printed bank notes for purposes of quality assurance. Corresponding sensors are used to detect individual properties and features of the bank notes, for example the printed image and/or other security or authenticity features, which are evaluated and checked in a control device. Bank notes that meet the quality requirements can then be put into circulation by a central bank. The remaining bank notes not meeting the quality requirements are generally destroyed immediately, for example by being diverted to a shredder.

The bank notes to be checked are usually provided in a stack, the serial numbers of the single notes in the stack being present in monotonically descending or ascending order. The notes are then singly removed from the stack and processed successively in accordance with their ascending or descending order of their serial numbers. Inputting the serial number of the first bank note of the stack to the control device of the bank note processing system permits the serial number of the currently processed bank note to be calculated due to the known order of notes in the stack. Calculation of the current serial number is required in particular when sensor detection of the serial number printed on the bank note to be processed is difficult or time-consuming, for example due to the type face and/or print size of the serial numbers.

During calculation of the serial number of the currently processed bank note a problem occurs, however, when two or more bank notes are removed from the stack simultaneously due to a disturbance, there is too little distance, in particular an over-lap, between two or more successively removed bank notes, or a jam of several bank notes occurs. In these cases, reliable calculation of the serial numbers of following bank notes processed properly again is only possible if the precise number of bank notes involved in the disturbance is detected and this number is inputted to the control device.

For these reasons the following steps are performed in the case of a disturbance in known methods and systems for processing bank notes. The bank notes involved in the disturbance are deposited in a special bin of the bank note processing system and the processing of following bank notes in the stack stopped. The bank notes deposited in the special bin are removed from the bin by operating personnel and counted. This number is inputted to the control device of the processing system. Only then can the singling and processing of following bank notes in the stack be continued. Knowledge of the number of bank notes involved in the disturbance permits the control device to correctly calculate the serial numbers of the properly processed following bank notes of the stack.

However, these methods and systems have the disadvantage that when a disturbance occurs, bank note processing is stopped until the manually determined number of bank notes deposited in the special bin is inputted to the control device. This distinctly reduces the average throughput of bank notes to be checked per unit time.

It is the problem of the invention to state a method and system for processing bank notes with minimal throughput losses at the same time as easy implementation and handling This problem is solved by the method according to claim 1 and the system according to claim 16.

The inventive method for processing bank notes according to claim 1 has the following steps in the case of a disturbance during processing of a subset of bank notes: depositing the subset of bank notes, e.g. in a special bin; continuing processing of fol-of following bank notes in the stack in accordance with the first sequence of their serial numbers; continuing determination of the second sequence of serial numbers for properly processed following bank notes using a hypothetical number of bank notes in the subset.

The corresponding inventive system for processing bank notes according to claim 16 has in particular the following features: a control device for controlling the processing machine in the case of a disturbance during processing of a subset of bank notes in such a way that the processing of following bank notes in the stack is continued in accordance with the first sequence of their serial numbers, and for determining a second sequence of serial numbers of processed bank notes, the determination of the second sequence of serial numbers after the disturbance for the processed following bank notes being effected using a hypothetical number of bank notes in the subset.

The invention is based on the idea of not stopping the processing of bank notes in the case of a disturbance but continuing it, the calculation of the second sequence of serial numbers of properly processed following bank notes being simultaneously continued assuming a hypothetical number for the bank notes involved in the disturbance, i.e. without precise knowledge of their actual number. Determination of the second sequence of serial numbers can be based on an estimation of the hypothetical number of bank notes involved in the disturbance, for example supported by measuring data, on a calculation likewise supported by measuring data, or on a specification of a predetermined number. The predetermined number is preferably based on empirical values for the number of bank notes typically involved in disturbances. If it is e.g. observed that in most cases only two bank notes are involved in multiple removals or other disturbances, the hypothetical predetermined number is set at the fixed value of two.

Preferably, it is provided that the thus determined second sequence of serial numbers is checked during and/or after continued processing of following bank notes in the stack. The check of the second sequence is effected with reference to the actual number of bank notes in the subset that was deposited in a special bin. If the check shows that the determined second sequence of serial numbers is not consistent with the actual number of bank notes involved in the disturbance, the determined second sequence can be accordingly corrected by an operator. This correction is likewise effected during and/or after continued processing of following bank notes in the stack.

In contrast to the prior art, bank note processing is not stopped in the inventive method and system after occurrence of a disturbance for manual determination of the actual number of bank notes involved in the disturbance, but continued with a hypothetical number after the bank notes involved in the disturbance have been deposited. Comparison of the hypothetical number with the actual number with reference to the bank notes deposited in the special bin can then be effected during and/or only after the end of continued processing of all following bank notes of the stack, without bank note processing having to be interrupted.

Compared to the method and system usually employed, this achieves the advantage of guaranteeing high throughput of bank notes to be processed at the same time as simple operation.

According to the invention, the terms "hypothetical number" and "actual number" refer not only to a mere number of bank notes but also to a set of bank notes with a hypothetical or actual sequence of serial numbers. Determination of the second sequence can thus also be effected using a hypothetical sequence of serial numbers of bank notes in the subset. Accordingly, the check and/or correction of the second sequence can be performed with reference to the actual sequence of serial numbers of bank notes in the subset.

The invention will be explained in more detail in the following with reference to figures, in which:

FIG. 2 shows a representation of a first and second sequence of serial numbers of the bank notes processed by the inventive method; and FIG. 3 shows a representation of the second sequence of serial numbers according to FIG. 2 before and after correction.

Figure 1:
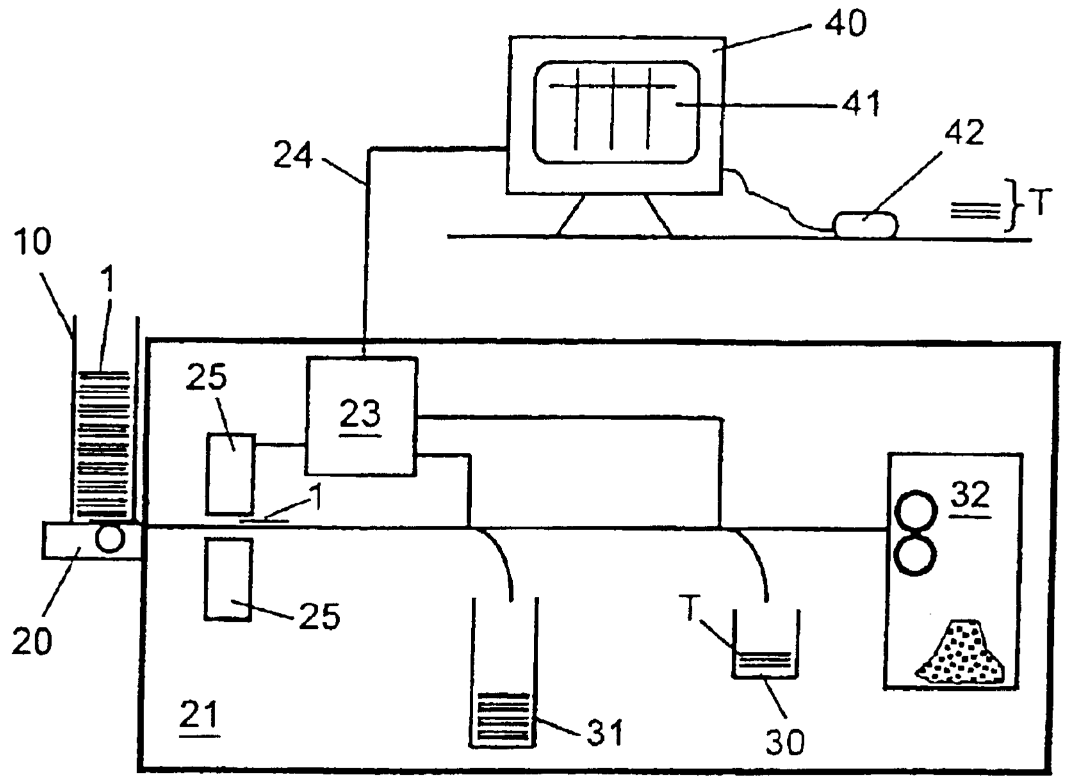
FIG. 1 shows an inventive system for processing bank notes.

FIG. 1 shows an inventive system for processing bank notes. Bank notes 1 to be processed are inputted in the form of stack 10 to singling device 20 shown highly schematized here, in which they are removed singly from stack 10 and supplied to processing device 21. There, single bank notes 1 are checked for certain properties by corresponding sensors 25. Depending on the case of application and requirements for the particular check, sensors 25 are optical sensors, for example image sensors, or mechanical, acoustic or magnetic sensors. The measuring data or signals produced by sensors 25 are supplied to control device 23. In dependence on the result of the check of single bank notes 1, the latter are deposited in individual bins 30, 31 or possibly supplied to destruction device 32, for example a shredder.

Bank notes 1 are preferably provided in large units containing up to one million bank notes and then inputted to singling device 20 in substacks containing up to about 1000 bank notes. According to the invention, the term "stack" therefore also refers to such a large unit of bank notes. This also holds in particular when such a unit contains bank notes only stacked in the substacks.

In addition, check device 40 is provided, being disposed outside processing device 21 and operable independently of the particular working condition of processing device 21. Check device 40 serves to check data that are produced in particular in control device 23. The corresponding data are transferred by one or more data lines 24 in the shown example. It is fundamentally also possible to transfer the data via a wireless connection or via data carriers, for example floppy disks or smart cards.

In the shown example, check device 40 is spatially separate from processing device 21 and control device 23. It is fundamentally also possible to integrate check device 40 in processing device 21 or control device 23. This has the advantage, among others, that monitoring of bank note processing and a check of thereby produced data, in particular of calculated serial number sequences, can be effected from one workplace.

Hereinafter, the inventive mode of functioning of the system for processing bank notes in the case of a disturbance during processing of a subset of bank notes will be explained in more detail.

The serial numbers of single bank notes 1 to be processed in stack 10 provided in singling device 20 are present in known first sequence F1. An example of first sequence F1 of serial numbers is shown in the column designated F1 in the table shown in FIG. 2. In this example, the bank notes are present in stack 10 with monotonically ascending serial numbers and are removed singly from stack 10 and supplied to processing device 21 in accordance with first sequence F1. If a first serial number is given, having the final number 01 in the shown example, control device 23 can calculate in simple fashion the serial numbers of bank notes 1 singly removed and currently processed. Each serial number is generally assigned a record containing information about the course and/or result of processing, in particular of the quality check.

However, the described computational determination of second sequence F2 of serial numbers is no longer possible in the case of disturbances, for example double or multiple removal, too little distance between singly removed bank notes or a bank note jam, since the exact number of bank notes 1 involved in the disturbance would have to be known to permit determination of the correct serial numbers of following bank notes on which processing is effected free from trouble.

As explained above, in prior art methods and systems, the processing of following bank notes is therefore stopped and the number of bank notes involved in the disturbance and deposited in special bin 30 then determined by an operator by a count. Only when this number is inputted to control device 23 is the processing of following bank notes continued.

In contrast, the inventive method and system provide that subset T of bank notes 1 involved in the disturbance is deposited in special bin 30 and the processing of following bank notes simultaneously continued without interruption, preferably until all following bank notes of stack 10 are processed. As explained above, stack 10 can also be a large unit of bank notes comprising a plurality of substacks. In addition, the calcu-calculation of second sequence F2 of serial numbers of single bank notes following the disturbance and properly processed is simultaneously continued assuming a hypothetical number of bank notes involved in the disturbance.

This calculation can be effected e.g. in the simplest case by adding a predetermined number to the serial number of the last bank note properly processed. In the shown example of FIG. 2, it is assumed in determination of the serial numbers of following bank notes that the disturbance involved only two bank notes, which have the final numbers 07 and 08 in this example. These serial numbers are presented in the table column headed F1–F2.

The now following further step is shown in FIG. 3. During or after continued processing of following bank notes, the data of calculated second sequence F2 are transferred to check device 40 and represented there for example on display 41. The manner of representation on display 41 can be similar to the representation selected in the table of FIG. 3. Preferably, subset T is also taken from special bin 30 of processing device 21 and brought to check device 40 for a check. The serial numbers of these bank notes are presented in FIG. 3 in the area headed T, which is not part of the table.

The operator can now perform a check of calculated sequence F2 of serial numbers by considering subset T of bank notes 1 involved in the disturbance and deposited in special bin 30 and checking their number and/or serial numbers for consistency with calculated sequence F2. On the check device the operator can compare subset T of bank notes involved in the disturbance in particular with the serial numbers of those bank notes assumed to be involved in the disturbance. These serial numbers are shown in the table column headed F1–F2.

In the example shown in FIG. 3, subset T of bank notes involved in the disturbance comprises three bank notes whose serial numbers have the final figures 07, 08 and 09. In this case a correction of calculated second sequence F2 is thus obviously required since the serial number with the final figures 09 initially calculated for the first following and properly processed bank note is not consistent with content T of special bin 30. The serial number with the final figures 09 must thus be removed from calculated second sequence F2. This is effected by means of input device 42, which is de-designed in the shown example as a computer mouse. Preferably, the correction mode of check device 40 is equipped with a so-called drag & drop function, by which the serial number to be corrected is selected in the table shown on display 41 and can be removed from second sequence F2. Instead of a computer mouse, a touch screen or a keyboard can also be used as input device 42 for correcting sequence F2.

A corresponding correction process is shown in the columns of the table shown in FIG. 3 headed F2, F1–F2 and F2*k*. The serial number with the final figures 09 to be taken from second sequence F2 is shifted to table column F1–F2, so that checked and corrected second sequence F2*k* is finally obtained, which now contains the actual sequence of serial numbers of properly processed bank notes.

In the examples described above, the invention has been explained with reference to only one disturbance occurring during processing. Obviously, the invention can also be used in advantageous fashion when two or more disturbances occur. During the check and possible correction of calculated sequence F2, the bank notes deposited in the special bin are divided into individual subsets T and the actual number of bank notes involved in the particular disturbance in the area of the disturbances is compared with calculated sequence F2.

What is claimed is:

1. A method for processing bank notes wherein bank notes are provided in a stack, the bank notes each having a serial number and being present in the stack in accordance with a first sequence of the serial numbers, the bank notes are removed singly from the stack and processed successively in accordance with the first sequence of the serial numbers, and a second sequence of the serial numbers of processed bank notes is determined, and wherein the following steps are performed in a case of a disturbance during processing of a subset of bank notes:

depositing the subset of bank notes, continuing the processing of following bank notes in the stack in accordance with the first sequence of the serial numbers, continuing the determination of the second sequence of the serial numbers for the processed following bank notes using a hypothetical number of bank notes in the subset.

2. The method according to claim 1, wherein a check of the determined second sequence of serial numbers is performed with reference to the actual number of bank notes in the subset.

3. The method according to claim 2, wherein the check of the second sequence is performed during or after the continued processing of following bank notes of the stack.

4. The method according to claim 1, wherein a correction of the second sequence is performed.

5. The method according to claim 4, the correction of the second sequence is performed during after the continued processing of following bank notes of the stack.

6. The method according to claim 5, wherein the correction of the second sequence is performed only after the end of processing of all bank notes of the stack.

7. The method according to claim 1, wherein the processing of the bank notes is performed in a processing device, and the check or correction of the second sequence in a check device spatially separate from the processing device or integrated in the processing device.

8. The method according to claim 7, wherein data on the first or second sequence of serial numbers is transferred from the processing device vice to the check device.

9. The method according to claim 7, wherein the subset of deposited bank notes or information on the subset of deposited bank notes is transferred to the check device.

10. The method according to claim 1, wherein the disturbance during processing of a subset of bank notes is present when the bank notes of the subset have not been removed singly from the stack or when the bank notes of the subset cannot be processed successively in defined fashion, in particular due to too little distance between the single bank notes or due to a jam.

11. The method according to claim 1, wherein the second sequence of serial numbers is calculated using the serial number of a first bank note of the stack and the order of the serial numbers of bank notes in the stack.

12. The method according to claim 1, wherein the hypothetical number of bank notes in the subset is derived on the basis of measuring data.

13. The method according to claim 1, wherein the hypothetical number of bank notes in the subset is given by specification of a predetermined number.

14. The method according to claim 1, wherein the printed image or quality or security or authenticity features of the bank notes are checked during processing of the bank notes.

15. The method according to claim 14, wherein the bank notes are sorted in dependence on the result of the check, in particular outputted to different bins or supplied to a destruction device.

16. The method according to claim 1, wherein the second sequence of serial numbers is calculated using the serial number of the first bank note of the stack and regularly descending or ascending order of the serial numbers of bank notes in the stack.

17. A system for processing bank notes having a singling device for receiving a stack of bank notes and removing single bank notes from the stack, the bank notes each having a serial number and being present in the stack in accordance with a first sequence of the serial numbers, a processing device for processing the bank notes removed singly from the stack in accordance with the first sequence of the serial numbers, a special bin for receiving a subset of bank notes on which a disturbance of processing has occurred, and a control device arranged so as to control the processing device in the case of a disturbance during processing of a subset of bank notes in such a way that the processing of following bank notes in the stack is continued in accordance with the first sequence of the serial numbers, and to determine a second sequence of serial numbers of processed bank notes after the disturbance of the processed following bank notes by using a hypothetical number of bank notes in the subset.

18. The system according to claim 17, wherein a check device is provided for checking the second sequence with reference to the actual number of bank notes in the subset.

19. The system according to claim 18, wherein the check device is formed for correcting the second sequence.

20. The system according to claim 17, wherein the check device is spatially separate from the processing device or control device, or integrated in the processing device or control device.

21. The system according to claim 17, wherein the processing device has means for checking the printed image and/or quality and/or security or authenticity features of the bank notes.

22. The system according to claim 21, wherein the processing device has different bins or a destruction device to which bank notes are outputted in dependence on the result of the check.

23. The system according to claim 17, wherein the processing device has a specific bin in which the subset of bank notes can be deposited.

24. The system according to claim 23, wherein the means for detecting a disturbance produces measuring data on the basis of which the hypothetical number of bank notes in the subset is derived.

25. The system according to claim 17, wherein the processing device has means for detecting a disturbance during processing of bank notes.

26. The system according to claim 25, wherein said disturbance comprises a multiple removal or jam.

27. The system according to claim 17, wherein an input device is provided to permit correction of the second sequence to be performed by a user.

28. The system according to claim 27, wherein said input device comprises a keyboard, touch screen or computer mouse.

* * * * *